(12) United States Patent
Gilson (10) Patent No.: US 10,108,677 B2
(45) Date of Patent: Oct. 23, 2018

(54) SOFTWARE PRECEDENCE IN TERNARY CONTENT-ADDRESSABLE MEMORY (TCAM)

(71) Applicant: Ciena Corporation, Hanover, MD (US)

(72) Inventor: David Gilson, Honolulu, HI (US)

(73) Assignee: Ciena Corporation, Hanover, MD (US)

( * ) Notice: Subject to any disclaimer, the term of this patent is extended or adjusted under 35 U.S.C. 154(b) by 435 days.

(21) Appl. No.: 14/954,285

(22) Filed: Nov. 30, 2015

(65) Prior Publication Data

US 2017/0154044 A1 Jun. 1, 2017

(51) Int. Cl.
*G06F 17/30* (2006.01)

(52) U.S. Cl.
CPC .... *G06F 17/3053* (2013.01); *G06F 17/30554* (2013.01); *G06F 17/30982* (2013.01)

(58) Field of Classification Search
CPC combination set(s) only.
See application file for complete search history.

(56) References Cited

U.S. PATENT DOCUMENTS

| 7,562,196 B2 * | 7/2009 | Kao | G11C 15/00 710/244 |
| 8,990,492 B1 * | 3/2015 | Zhou | G06F 17/00 711/105 |
| 2009/0201808 A1 * | 8/2009 | Bettink | H04L 45/00 370/230 |

\* cited by examiner

*Primary Examiner* — Etienne P Leroux
(74) *Attorney, Agent, or Firm* — Clements Bernard Walker PLLC; Christopher L. Bernard; Lawrence A. Baratta, Jr.

(57) ABSTRACT

A method for processing ternary content-addressable memory (TCAM) data. The method may include transmitting a search query to a TCAM device. The TCAM device may store a plurality of TCAM entries. The method may further include obtaining a first matched entry and a second matched entry from the plurality of TCAM entries. The method may further include obtaining, from software precedence data, a first precedence value for the first matched entry and a second precedence value for the second matched entry. The method may further include comparing, using a priority criterion, the first precedence value for the first matched entry with the second precedence value for the second matched entry to select a resultant entry. The priority criterion may determine a precedence order that a computing device uses the plurality of TCAM entries. The method may further include processing, using the computing device, the resultant entry.

19 Claims, 9 Drawing Sheets

FIG. 1

| TCAM Entries 200 | Hardware Addresses 210 | TCAM Classification Keys 220 | TCAM Payloads 230 | Software Precedence Data 240 |
|---|---|---|---|---|
| 201 TCAM Entry A | 211 Address A | 221 Key A | 231 Payload A | 241 Precedence Value A |
| 202 TCAM Entry B | 212 Address B | 222 Key B | 232 Payload B | 242 Precedence Value B |
| 203 TCAM Entry C | 213 Address C | 223 Key C | 233 Payload C | 243 Precedence Value C |
| 204 TCAM Entry D | 214 Address D | 224 Key D | 234 Payload D | 244 Precedence Value D |
| 205 TCAM Entry E | 215 Address E | 225 Key E | 235 Payload E | 245 Precedence Value E |

SOFTWARE PRECEDENCE IN TERNARY CONTENT-ADDRESSABLE MEMORY (TCAM)

BACKGROUND

Content-addressable memory (CAM) devices may include a type of memory that provides searchable access for high-speed data applications. In particular, based on a binary sequence, data may be accessed inside a CAM device without searching each entry within the CAM device. Thus, CAM devices may provide networks with the capability to perform Internet Protocol (IP) address lookups and other types of network searches in a fast and reliable manner.

SUMMARY

In general, in one aspect, embodiments relate to a method for processing ternary content-addressable memory (TCAM) data. The method includes transmitting a search query to a TCAM device, wherein the TCAM device stores a plurality of TCAM entries. The method further includes obtaining, from the TCAM device and in response to transmitting the search query, a first matched entry and a second matched entry from the plurality of TCAM entries. The method further includes obtaining, from software precedence data, a first precedence value for the first matched entry and a second precedence value for the second matched entry. The method further includes comparing, using a priority criterion, the first precedence value for the first matched entry with the second precedence value for the second matched entry to select a resultant entry. The priority criterion determines a precedence order that a computing device uses the plurality of TCAM entries. The method further includes processing, using the computing device, the resultant entry.

In general, in one aspect, the invention relates to a system for processing ternary content-addressable memory (TCAM) data. The system includes a TCAM device that stores various TCAM entries. The system further includes a computing device coupled to the TCAM device. The computing device transmits a search query to the TCAM device. The computing device further obtains, from the TCAM device and in response to transmitting the search query, a first matched entry and a second matched entry from the plurality of TCAM entries. The computing device further obtain, from software precedence data, a first precedence value for the first matched entry and a second precedence value for the second matched entry. The computing device further compare, using a priority criterion, the first precedence value for the first matched entry with the second precedence value for the second matched entry to select a resultant entry. The priority criterion determines a precedence order that the computing device uses the plurality of TCAM entries. The computing system further processes the first resultant entry.

In general, in one aspect, the invention relates to a non-transitory computer readable medium (CRM) storing a plurality of instructions for processing ternary content-addressable (TCAM) data. The instructions, when executed by a computer processor, include functionality for transmitting a search query to a TCAM device, wherein the TCAM device stores a plurality of TCAM entries. The instructions further include functionality for obtaining, from the TCAM device and in response to transmitting the search query, a first matched entry and a second matched entry from the plurality of TCAM entries. The instructions further include functionality for obtaining, from software precedence data, a first precedence value for the first matched entry and a second precedence value for the second matched entry. The instructions further include functionality for comparing, using a priority criterion, the first precedence value for the first matched entry with the second precedence value for the second matched entry to select a resultant entry. The priority criterion determines a precedence order that a software application uses the plurality of TCAM entries The instructions further include functionality for processing, using the software application, the resultant entry.

Other aspects of the invention will be apparent from the following description and the appended claims.

BRIEF DESCRIPTION OF DRAWINGS

FIGS. 6.1-6.3 show an example in accordance with one or more embodiments.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, system and a computer-readable medium for processing ternary content-addressable memory (TCAM) data. In particular, one or more embodiments are directed to a method that obtains various precedence values with respect to various matched entries obtained from a TCAM device. Thus, the method may compare each precedence value to determine the resultant entry from the matched entries. Accordingly, the resultant entry may be used by a hardware device or a software application operating on a computing device. In one or more embodiments, the precedence values for various TCAM entries in a TCAM device are reprovisioned using software on a computing device. As such, a hardware address associated with a particular TCAM entry may remain the same, while the precedence value associated with that TCAM entry may be updated using software.

Figure 1:
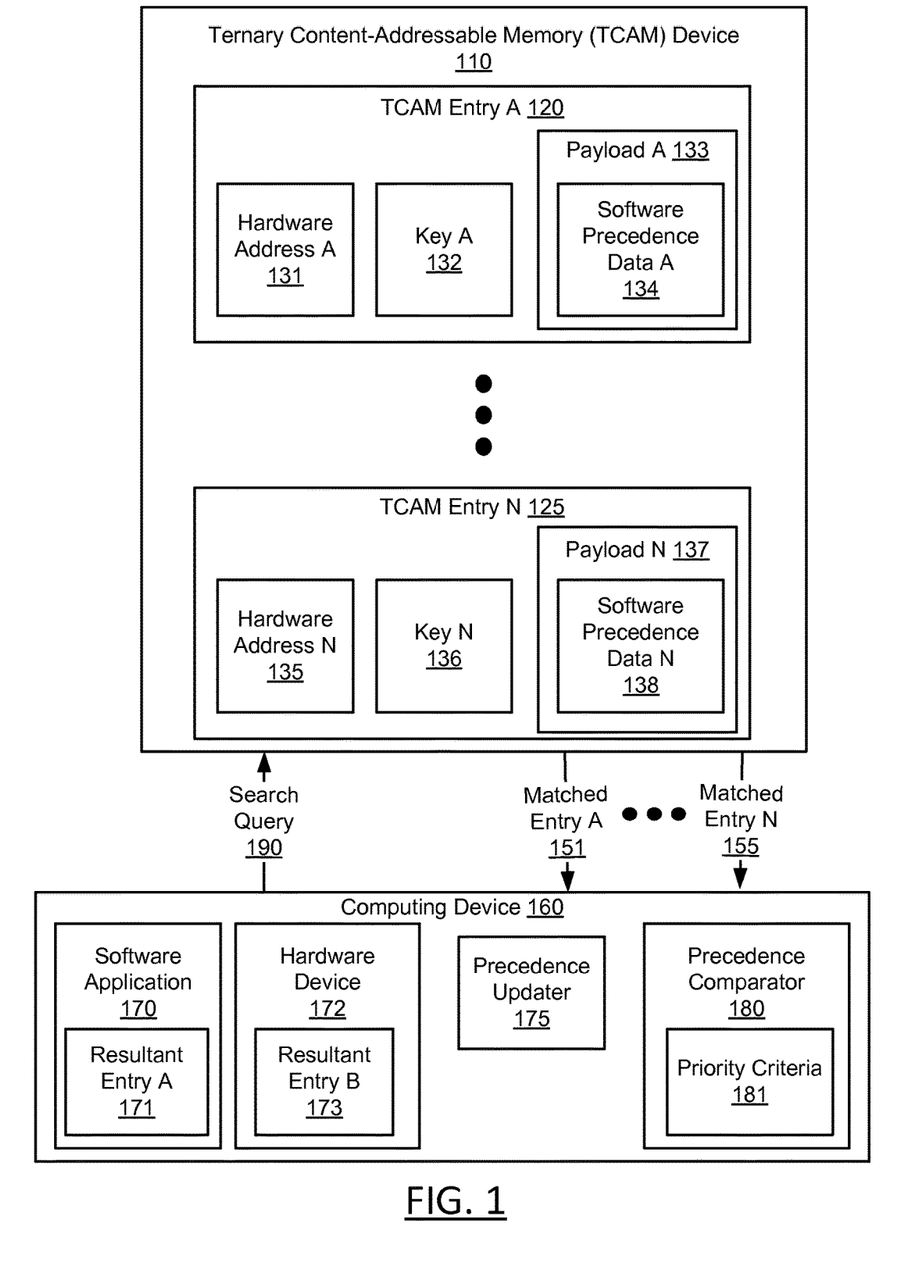
FIGS. 1 and 2 show systems in accordance with one or more embodiments.

FIG. 1 shows a block diagram of a system in accordance with one or more embodiments. In one or more embodiments, as shown in FIG. 1, a ternary content-addressable memory (TCAM) device (110) is operably coupled with a computing device (160). For example, the TCAM device (110) may be hardware and/or software that includes functionality for storing and/or locating various TCAM entries (e.g., TCAM Entry A (120), TCAM Entry N (125)) inside the TCAM device (110). Specifically, a TCAM entry may be defined to include a hardware address (e.g., hardware address A (131), hardware address N (135)), a TCAM classification key (e.g., key A (132), key N (136)), a TCAM payload (e.g., payload A (133), payload N (137)), and software precedence data (e.g., software precedence data A (134), software precedence data N (138)). The hardware addresses (131, 135) may be physical addresses that describe the locations of the TCAM entries (120, 125) inside the TCAM device (110). The TCAM classification keys (132, 136) may be information, such as a data string, stored inside the TCAM device (110) that determines whether a particular TCAM entry matches to a search query (190). The payloads (133, 137) may be data stored in the TCAM device (110) as shown in FIG. 1 or in a storage device (not shown) external to the TCAM device (110). When one of the TCAM classification keys (132, 136) matches the search query (190), data from the corresponding payload may be transmitted back to the computing device (160). Thus, a TCAM classification key may provide a hardware lookup for the TCAM entries (120, 125) inside the TCAM device (110). In one or more embodiments, a content-addressable memory (CAM) device is used in place of the TCAM device (110).

In one or more embodiments, the software precedence data (134, 137) is data that determines a precedence value for one of the TCAM entries (120, 125). On the other hand, a precedence value may be a data value that determines whether a TCAM entry is a resultant entry (e.g., resultant entry A (171), resultant entry B (173)) for use by a software application (170) and/or a hardware device (172). To illustrate this point, an example of software precedence data may be a binary number string such as "0101 0010" stored in a specific TCAM entry or in a storage device associated with the TCAM entry, while the precedence value may be '82' or the binary number equivalent of the binary number string derived from the software precedence data (e.g., "0101 0010" in the example). In other words, the precedence value is an interpretation of the software precedence data in accordance with one or more embodiments of the invention. Thus, precedence values may correspond to numbers, words, Boolean logic, and/or any other basis for providing a precedence order to different matched entries obtained from the TCAM device (110). In one or more embodiments, for example, precedence values correspond to numerical values that are greater than a total number of TCAM entries in the TCAM device (110). In other words, precedence values may include numerical values in the millions, while the TCAM device (110) may include less than a thousand total TCAM entries.

Furthermore, the TCAM device (110) may include functionality to search each TCAM entry within the TCAM device (110) using a search query (190) during a single operation or clock cycle. In particular, the search query (190) may be a sequence of data values that identifies one or more TCAM classification keys. For example, the sequence for the search query (190) may include a set of binary numbers (i.e., '0' and '1') as well as an 'X' input that may be classified as a "don't care" value. When performing a search of TCAM entries (120, 125) with a "don't care" value in the search query (190), the "don't care" value returns a match for a '1' value, a '0' value, or a "don't care" value. When the search query (190) matches to multiple TCAM entries (120, 125), classification overlap occurs accordingly among the matched entries (151, 155).

In response to searching the TCAM entries (120, 125), various matched entries (e.g., matched entry A (151), matched entry N (155)) may be determined by the TCAM device (110) that correspond to TCAM classification keys (132, 136). For example, the matched entries (151, 155) may include data obtained from the payloads (133, 137) that is transmitted back to the computing device (160). On the other hand, the matched entries (151, 155) may include information that identifies the respective TCAM entry within the TCAM device (110) and/or provides the location of data in an external storage device associated with the TCAM entries (120, 125).

In one or more embodiments, the computing device (160) includes a precedence comparator (180). The precedence comparator (180) may be software and/or hardware that includes functionality to determine, using the software precedence data (134, 138), a resultant entry (e.g., resultant entry A (171), resultant entry B (173) from the matched entries (e.g., 151, 155). Specifically, the precedence comparator (180) may extract various precedence values from software precedence data (134, 138) as well as compare the precedence values to one or more priority criteria (181). In one or more embodiments, for example, a priority criterion determines a precedence order that the matched entries (151, 155) are used by the software application (170) and/or hardware device (172) for performing one or more operations on the computing device (160). Thus, the matched entry highest in the precedence order may be selected as the resultant entry (171), while the unselected matched entries may be ignored by the software application (170) and/or hardware device (172). In one or more embodiments, for example, the software application (170) or the hardware device (172) is a client of the TCAM device (110). Example software applications may include various networking applications that perform Internet Protocol (IP) address lookups or a media access control (MAC) address lookup for a network, while the computing device (160) may be a network switch. An example hardware device may be a hardware pipeline in a switching application specific integrated circuit (ASIC), where the resultant entry B (173) from the search query (190) may determine a hardware pipeline decision. While the hardware device (172) is shown inside the computing device (160) in FIG. 1, in one or more embodiments, the hardware device (172) may be separate from the computing device (160).

In one or more embodiments, the computing device (160) includes a precedence updater (175). The precedence updater (175) may be software and/or hardware that includes functionality to reprovision precedence values for the TCAM entries (120, 125) in the TCAM device (110). In one or more embodiments, for example, the precedence updater (175) is a software application that changes individual precedence values for respective TCAM entries without changing the physical location of the respective TCAM entry inside the TCAM device (110). Thus, the precedence updater (175) may modify software precedence data to adjust the respective precedence value for the respective TCAM entry. In other words, the hardware addresses (131, 135) may remain the same for the TCAM entries (120, 125) while the software precedence data (134, 138) is updated by the precedence updater (175) to generate different precedence values.

Figure 2:
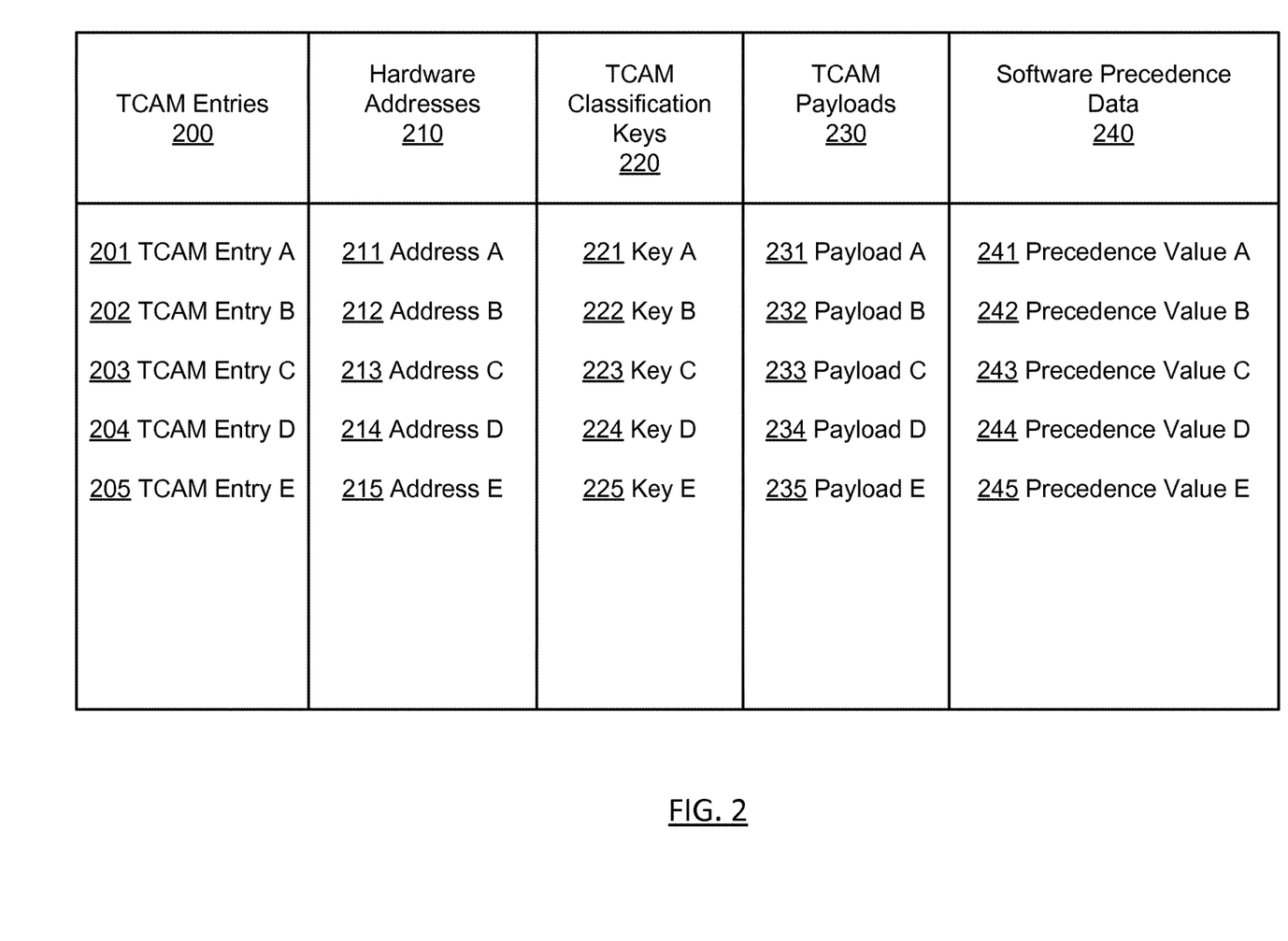

FIG. 2 shows a table in accordance with one or more embodiments. Specifically, as shown in FIG. 2, each row in the table corresponds to individual TCAM entry. In other words, each row in the table is a set of related elements of one of the TCAM entries (200). In particular, the TCAM entries (200) may be defined with respect to hardware addresses (210), TCAM classifications keys (220), TCAM payloads (230), and software precedence data (240). In particular, the TCAM entries (200) may include TCAM entry A (201), TCAM entry B (202), TCAM entry C (203), TCAM entry D (204), and TCAM entry E (205). The TCAM classifications keys (220) may relate to various keys (e.g., key A (221), key B (222), key C (223), key D (224), and key E (225)) that a TCAM device (not shown) compares with a search query (not shown). Thus, TCAM Entry A (201) may include an address A (211), a key A (221), a payload A (231), and a precedence value A (241). TCAM Entry B (202) may include an address B (212), a key B (222), a payload B (232), and a precedence value B (242). TCAM Entry C (203) may include an address C (213), a key C (223), a payload C (233), and a precedence value C (243). TCAM Entry D (204) may include an address D (214), a key D (224), a payload D (234), and a precedence value D (244). TCAM Entry E (205) may include an address E (215), a key E (225), a payload E (235), and a precedence value E (245).

Figure 3:
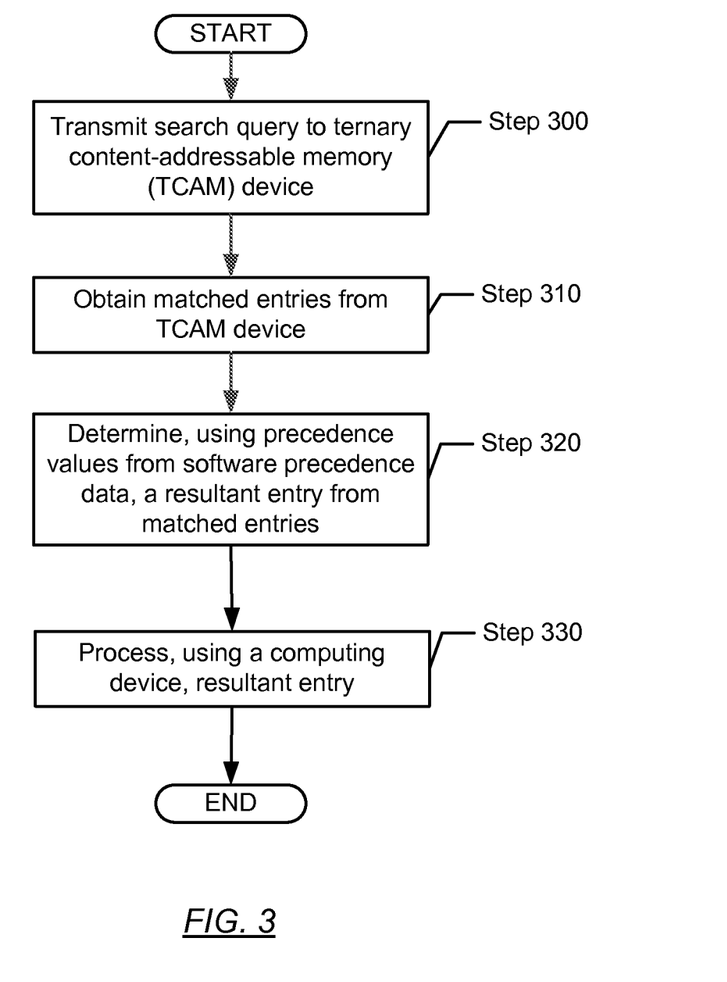
FIGS. 3, 4, and 5 show flowcharts in accordance with one or more embodiments.

FIG. 3 shows a flowchart for processing entries obtained from a TCAM device in accordance with one or more embodiments. Specifically, one or more steps in FIG. 3 may be performed by a computing device as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a search query is transmitted to a TCAM device in accordance with one or more embodiments. Specifically, a software application operating on a computing device or a hardware device may desire information stored in the TCAM device or in a separate memory location at an address identified by the TCAM device. Thus, a hardware device or a computing device operably connected to the TCAM device may transmit a search query to the TCAM device to obtain the desired information for the software application and/or hardware device.

In Step 310, various matched entries are obtained from a TCAM device in accordance with one or more embodiments. In response to the search query from Step 300, the TCAM device may provide various matched entries that have TCAM classification overlap to a computing device. Accordingly, the TCAM device may transmit each matched entry that results in a TCAM classification match with the search query in Step 300 as a sequence of data signals that are read by the computing device. On the other hand, the TCAM device may also provide various addresses for a storage device that the computing device accesses to obtain the matched entries.

In Step 320, a resultant entry is determined from various matched entries using precedence values from software precedence data in accordance with one or more embodiments. In one or more embodiments, for example, a precedence comparator analyzes the precedence values of the matched entries according to a priority criterion. In particular, the precedence values may be obtained from software precedence data stored with respect to each matched entry. In another embodiment, the precedence values are stored in a computing device operably connected to a TCAM device. For example, the computing device may include a separate storage device that stores software precedence data that identifies the precedence value for each TCAM entry in the TCAM device.

In Step 330, a computing device processes a resultant entry in accordance with one or more embodiments. Specifically, the software application may use the resultant entry to perform a software operation within a computing device, while the same software application may ignore the remaining matched entries from Step 310. For example, the search query in Step 300 may be a network address for a particular node on the network, while the resultant entry may provide the physical port on the network that a computing device may use to transmit data to the particular node. On the other hand, a hardware device operably connected to the TCAM device may obtain the resultant entry for processing.

Figure 4:
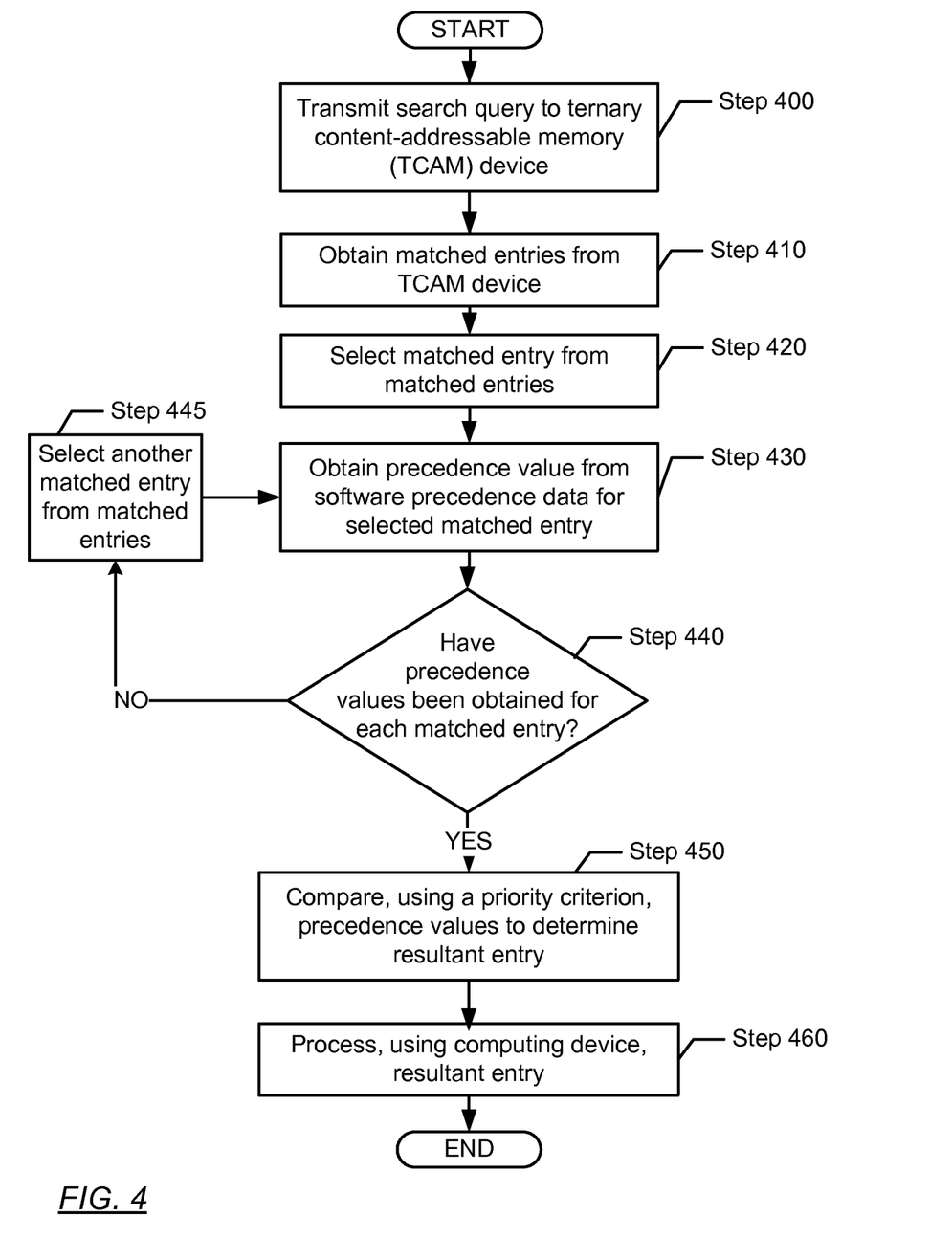

FIG. 4 shows a flowchart for processing entries obtained from a TCAM device in accordance with one or more embodiments. Specifically, one or more steps in FIG. 4 may be performed by a computing device as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a search query is transmitted to a TCAM device in accordance with one or more embodiments. In particular, a computing device may obtain a request from a software application for information stored in a TCAM device. The computing device may then determine a search query for locating various TCAM entries in the TCAM device according to a particular TCAM classification. Accordingly, the computing device may convert the search query into a digital or analog electrical signal that may then be transmitted to the TCAM device. On the other hand, a hardware device may be operably connected to the TCAM device. Accordingly, the hardware device may transmit a search query to the TCAM device.

In Step 410, various matched entries are obtained from a TCAM device in accordance with one or more embodiments. Specifically, a computing device may obtain data from one or more TCAM entries within the TCAM device that match the values of the search query in Step 400. For example, in response to receiving an electrical signal from a computing device, the TCAM device may search available TCAM entries using various search line drivers within the TCAM device. Thus, the search line drivers may be activated that correspond to the '0's, '1's, and 'X's in the search query. For example, the TCAM device may include an encoder that transmits various output signals to the encoder for each matched entry produced for a respective search query. At the encoder, these output signals may be converted into a data signal that includes information regarding the respective matched entry. This information may be a payload for a matched entry or be the location of the payload for the matched entry. Thus, the TCAM device may transmit the matched entries back to a computing device.

In Step 420, a matched entry is selected from various matched entries in accordance with one or more embodiments. For example, the matched entries obtained in Step 410 may be analyzed by a precedence comparator iteratively. Accordingly, the precedence comparator may compare each matched entry with the other matched entries until a resultant entry is found.

In Step 430, a precedence value is obtained from software precedence data for a selected matched entry in accordance with one or more embodiments. In one or more embodiments, for example, software precedence data is included in the payload of a TCAM entry stored in a TCAM device. Thus, the software precedence data may be transmitted to the computing device inside a matched entry. On the other hand, the computing device may obtain the software precedence data for a particular matched entry from an outside storage device.

In one or more embodiments, software precedence data is stored in various payloads located within the TCAM entries inside a TCAM device. Thus, when a payload is transmitted with a matched entry from the TCAM device, a computing device may extract software precedence data from the corresponding payload. In other embodiments, software precedence data associated with a particular matched entry may be stored on the computing device and/or on a separate storage device from the TCAM device. As such, the computing device may simply identify the software precedence data that corresponds to the respective matched entry from Step 420.

In Step 440, a determination is made whether a precedence value has been obtained for each matched entry in accordance with one or more embodiments. For example, a precedence comparator may iteratively obtain a precedence value for each matched entry until precedence values have been obtained for every matched entry or until a resultant entry has been found. When a determination is made that a precedence value has been obtained for each matched entry, the process may proceed to Step 450. When a determination is made that one or more precedence values have not been obtained for each matched entry, the process proceeds to Step 445.

In Step 445, another TCAM entry is selected from various matched entries in accordance with one or more embodiments. In particular, the next TCAM entry from among the matched entries in Step 410 may be selected iteratively and/or until a precedence value is obtained for each matched entry.

In Step 450, various precedence values are compared using a priority criterion to determine a resultant entry in accordance with one or more embodiments. In one or more embodiments, in particular, a precedence comparator may analyze the precedence values from Step 430 to determine which matched entry is the resultant entry. In one or more embodiments, different software applications and/or different hardware devices have different precedence criteria, which may result in different matched entries being selected as the resultant entry with respect to the same precedence values. To determine the resultant entry, in one or more embodiments, for example, the precedence comparator determines a ranking between each matched entry from Step 410. Thus, one matched entry may be first in the ranking, while the remaining matched entries may be located elsewhere in the ranking.

In one or more embodiments, for example, the priority criterion designates a largest absolute numerical value for determining the precedence value corresponding to the initial resultant entry. In another embodiment, the priority criterion may designate the lowest numerical value from various precedence values as determining the resultant entry. The priority criterion may also specify a function for determining the initial resultant entry from the software precedence data associated with the matched entries. In other words, the precedence comparator may use a weighting function with inputs from the software precedence data to determine a precedence order for the matched entries.

In other embodiments, the precedence comparator determines the priority of a particular matched entry, and then compares individually the priority of the particular matched entry to the priority of another matched entry in sequence. If the precedence comparator fails to find another matched entry with a higher priority, then the precedence comparator may select that particular matched entry as having the highest priority. If another matched entry is found to have a higher priority, then the precedence comparator may switch to using the newly found matched entry for comparing the priorities of the rest of the matched entries.

In Step 460, a resultant entry is processed using a computing device in accordance with one or more embodiments. Once a precedence comparator has determined the resultant entry in Step 450, the computing device may provide access to the payload of the resultant entry to a hardware device or a software application operating on the computing device. Thus, the software application may use information corresponding to the payload in one or more software operations and/or one or more hardware operations.

Figure 5:
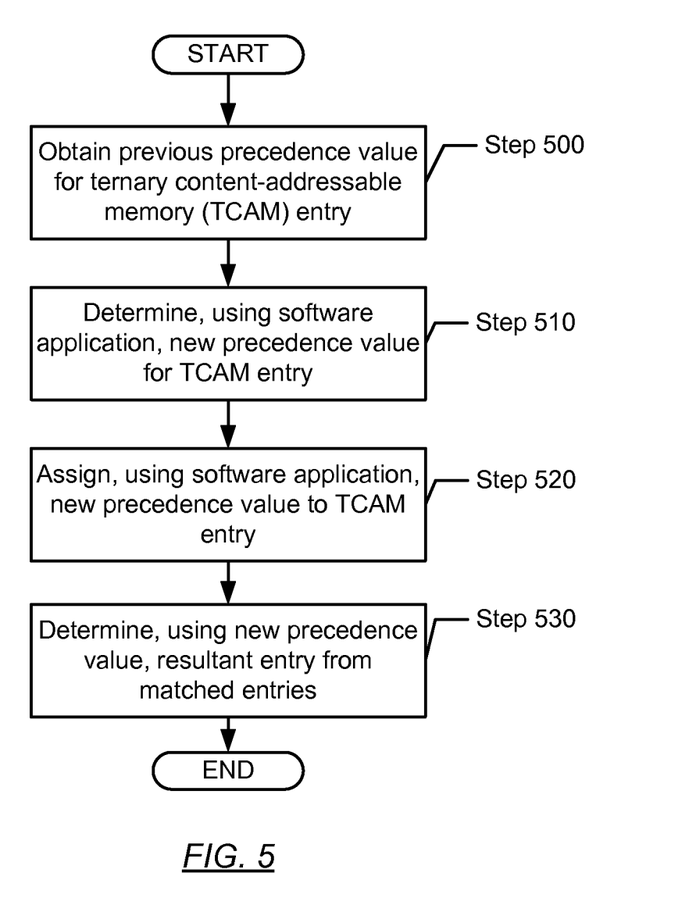

FIG. 5 shows a flowchart for reprovisioning precedence among various TCAM entries in accordance with one or more embodiments. Specifically, one or more steps in FIG. 5 may be performed by a computing device as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 500, a previous precedence value is obtained for a TCAM entry in accordance with one or more embodiments. The previous precedence value may be a precedence value that is used by one or more software applications for determining a resultant entry from a TCAM device. Specifically, in one or more embodiments, a computing device performs a lookup regarding the previous precedence value for a TCAM entry. For example, if software precedence data is located in a payload stored within a TCAM device, the computing device may transmit a search query to a TCAM device to obtain the payload for the TCAM entry. If the software precedence data is stored in a storage device external to the TCAM device or on the computing device, the computing device may obtain the software precedence data for the TCAM entry without transmitting a search query.

In Step 510, a new precedence value is determined for a TCAM entry using a software application in accordance with one or more embodiments. In one or more embodiments, for example, priorities of different TCAM entries within a TCAM device are rearranged for processing by a software application. Rather than reorganizing the data associated with various TCAM entries based on hardware addresses, in one or more embodiments, an individual precedence value is updated without updating precedence values for every TCAM entry. Thus, a software application may reprovision one or more precedence values with different precedence values in order to change a precedence order for determining the resultant entry from matched entries.

In one or more embodiments, for example, if a specific TCAM entry is determined to have greater priority for a particular software application, a new precedence value may be determined that places the specific TCAM entry with greater priority. In one or more embodiments for example, a user manually decides that the specific TCAM entry should have greater priority than one or more other TCAM entries. Thus, a computing device may obtain a user input to change the precedence value of the specific TCAM entry with respect to the one or more other TCAM entries. In one or more embodiments, the particular software application automatically changes the precedence values for one or more TCAM entries based on an algorithm associated with the software application. For example, precedence values for different TCAM entries may correspond to various nodes within a network. Thus, if the network's topology changes with respect to the nodes (e.g., new nodes are added to the network or nodes are disconnected from the network), a software application for administering the network may change the precedence values of the TCAM entries for the new nodes or disconnected nodes.

To illustrate this point, assume TCAM Entry A may have a precedence value of '100.' On the other hand, TCAM Entries B and C have precedence values '125' and '175,' respectively. If a resultant entry is determined by the TCAM entry with the highest value, TCAM Entry A may be selected for the resultant entry only if TCAM Entries B and C are not matched entries. However, if TCAM entry A is determined to have a new precedence value of '1000,' TCAM entry A may be selected for the resultant entry even if TCAM Entries B and C are also matched entries.

In Step 520, a new precedence value is assigned to a TCAM entry using a software application in accordance with one or more embodiments. In particular, the new precedence value determined in Step 510 may be applied to the corresponding TCAM entry for the TCAM device. For example, if precedence values are determined from software precedence data stored in a TCAM device, a software application operating on a computing device may delete the previous software precedence data for the TCAM entry in the TCAM device and insert new software precedence data inside the TCAM device that corresponds to the new precedence value. On the other hand, if precedence values are stored in a table in a storage device external to the TCAM device, the computing device may find a table entry that matches the corresponding TCAM entry and update the table entry with the new precedence value.

In Step 530, a resultant entry is determined from various matched entries using a new precedence value in accordance with one or more embodiments. Thus, when the corresponding TCAM entry is returned as a matched entry at a later date, the new precedence value determined in Step 510 may be used by a hardware device or a software application for determining the resultant entry.

In one or more embodiments, the processes described in FIGS. 4 and 5 may eliminate a reordering of location of TCAM entries inside a TCAM device. For example, by implementing a precedence order that does not follow the lowest-hardware-address-wins rule, a computing device that is operably connected to a TCAM device may avoid regularly changing the location of TCAM entries in order to change the precedence order of the TCAM device. In other words, TCAM entry software-driven roll-ups and roll-downs that include updating each TCAM entry to change the precedence order may be avoided. On a large TCAM device, software-driven roll-ups and roll-downs may be very expensive from a performance-of-scale perspective.

Figure 61:
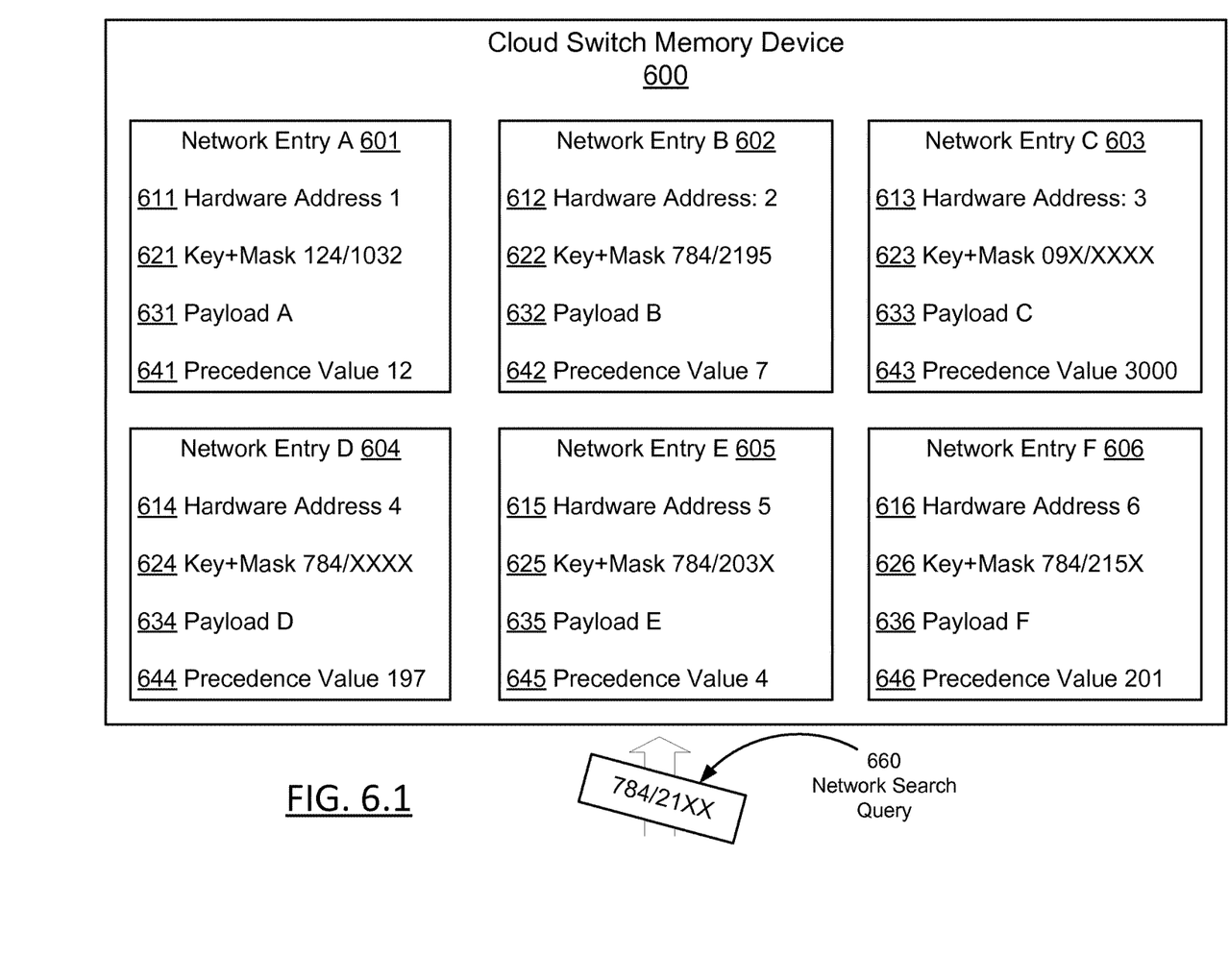
Figure 62:
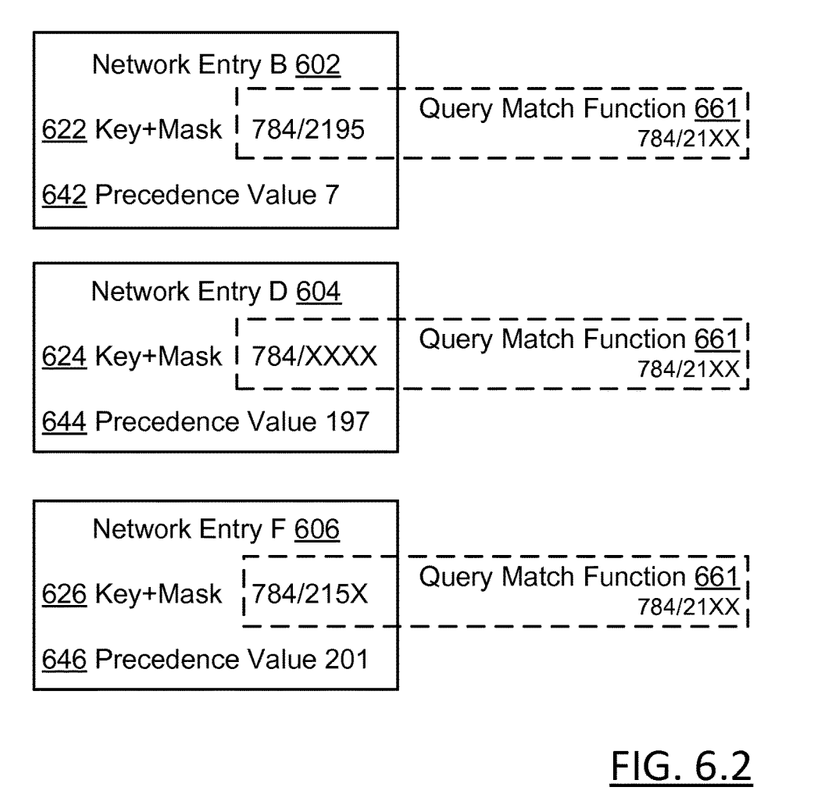
Figure 63:
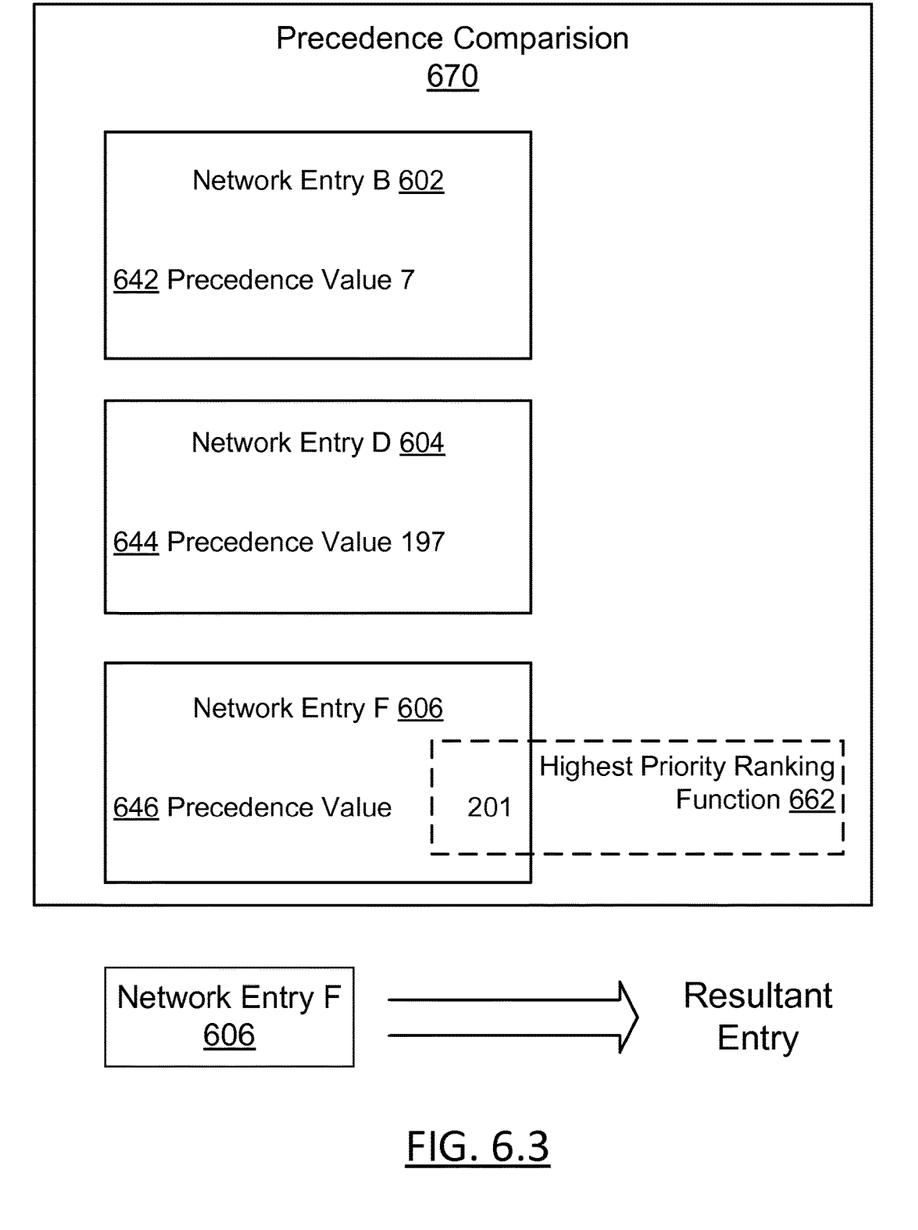

FIGS. 6.1-6.3 provides an example of using software precedence for determining resultant entries. The following example is for explanatory purposes only and not intended to limit the scope of the invention.

In FIG. 6.1, a cloud switch memory device (600), i.e., an example of a TCAM device, includes various network entries (i.e., Network Entry A (601), Network Entry B (602), Network Entry C (603), Network Entry D (604), Network Entry E (605), Network Entry F (606)). The network entries (601, 602, 603, 604, 605, 606) include various hardware addresses (i.e., Hardware Address 1 (611), Hardware Address 2 (612), Hardware Address 3 (613), Hardware Address 4 (614), Hardware Address 5 (615), Hardware Address 6 (616)), various TCAM classifications (i.e., Key+Mask 124/1032 (621), Key+Mask 784/2195 (622), Key+Mask 09X/XXXX (623), Key+Mask 784/XXXX (624), Key+Mask 784/203X (625), Key+Mask 784/215X (626)), various payloads (i.e., payload A (631), payload B (632), payload C (633), payload D (634), payload E (635), payload F (636)), and various precedence values (i.e., precedence value 12 (641), precedence value 7 (642), precedence value 3000 (643), precedence value 197 (644), precedence value 4 (645), precedence value 201 (646)). Furthermore, a network search query (660) is transmitted to the cloud switch memory device (600) that includes a search query value of '784/21XX'.

Turning to FIG. 6.2, using the network search query (660), several matched entries are obtained from the cloud switch memory device (600). Specifically, network entry B (602), network entry D (604), and network entry F (606) are returned in response a query match function (661) matching the search query value of '784/21XX' with the key+masks of the network entries (602, 604, 606). The query match function (661) may correspond to one or more operations performed inside the cloud switch memory device. Thus, the query match function may go through the individual values of '784/21XX' while comparing each individual value to a respective key+mask value among the network entries (601, 602, 603, 604, 605, 606) until network entry B (602), network entry D (604), and network entry F (606) are determined to be matched entries. In contrast, network entry A (601), network entry C (603), and network entry E (605) are ignored by the query match function (661), because the search query value does not match the key+mask values accordingly.

Turning to FIG. 6.3, a precedence comparison (670) is performed among network entry B (602), network entry D (604), and network entry F (606). In particular, precedence value 7 (642), precedence value 197 (644), and precedence value 201 (646) are compared for which precedence value is largest. Thus, a highest priority ranking function (662), which may be performed by a precedence comparator, determines that network entry F (606) has the largest absolute numerical value. Accordingly, network entry F (606) is determined to be the resultant entry based on the network search query (660).

Figure 7:
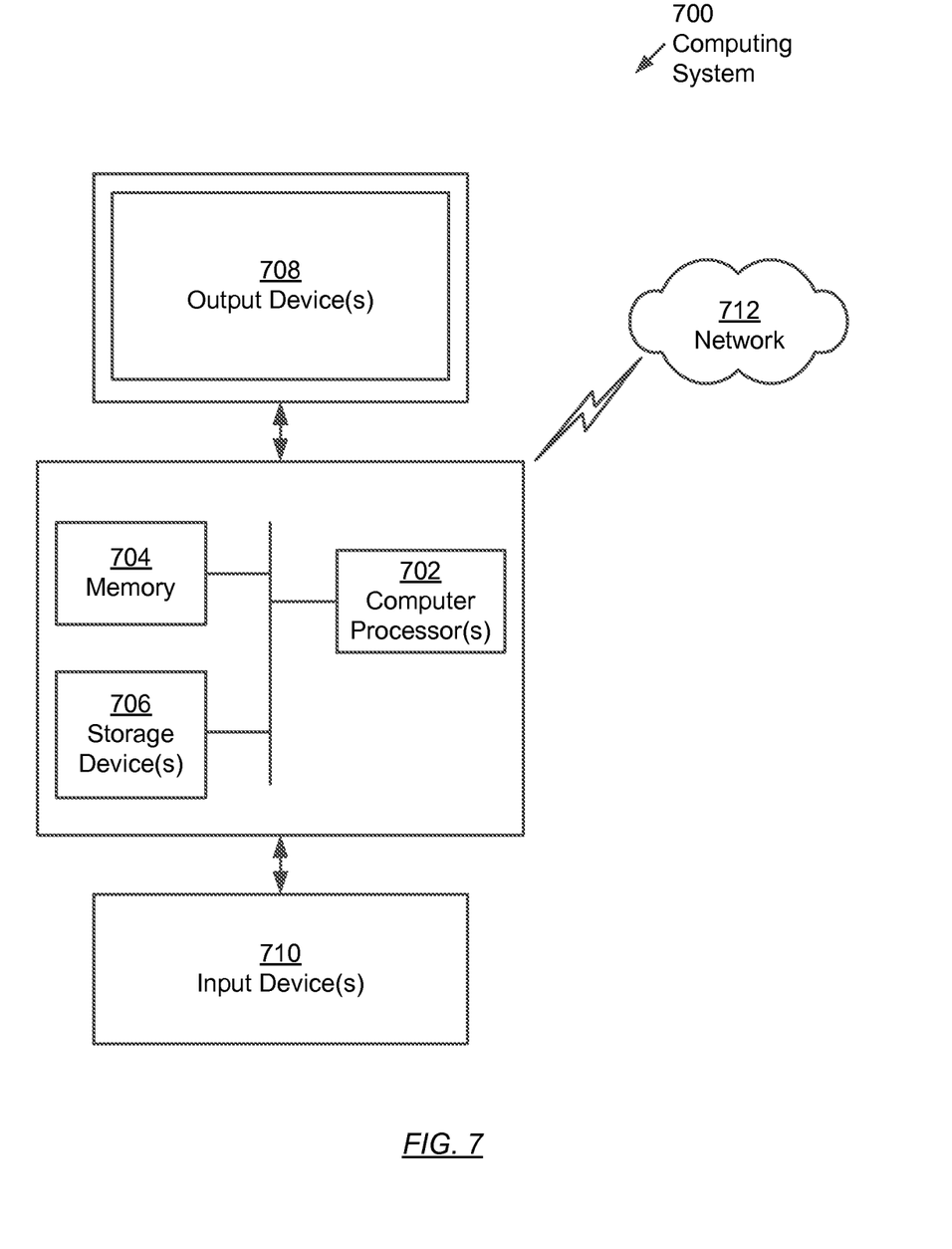
FIG. 7 shows a computing system in accordance with one or more embodiments.

Embodiments may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores, of a processor. The computing system (700) may also include one or more input device(s) (710), such as a touchscreen, keyboard, mouse, microphone, touchpad, electronic pen, or any other type of input device. Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor or processors, is configured to perform embodiments.

Further, one or more elements of the aforementioned computing system (700) may be located at a remote location and connected to the other elements over a network (712). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing ternary content-addressable memory (TCAM) data, comprising:
    assigning, by a computing device using a software application and based on a previous precedence value, a first precedence value to a payload in a TCAM entry of a TCAM device, wherein the previous precedence value is extracted and deleted from the payload by the software application;
    transmitting, by the computing device, a first search query to the TCAM device,
    wherein the TCAM device stores a plurality of TCAM entries comprising the TCAM entry;
    obtaining, from the TCAM device and in response to transmitting the first search query, a first matched entry corresponding to the TCAM entry and a second matched entry from the plurality of TCAM entries;
    obtaining, by the computing device and from first software precedence data stored in payloads from the first matched entry and the second matched entry, the first precedence value for the first matched entry and a second precedence value for the second matched entry;
    comparing, by the computing device and using a priority criterion, the first precedence value for the first matched entry with the second precedence value for the second matched entry to select a first resultant entry, wherein the priority criterion determines a first precedence order that the computing device uses the plurality of TCAM entries; and
    processing, using the computing device, the first resultant entry.

2. The method of claim 1, further comprising:
    obtaining, by a precedence updater, a previous precedence value for a TCAM entry;
    determining, using the precedence updater, a new precedence value for the TCAM entry, wherein the new precedence value is different from the previous precedence value; and
    assigning, to the TCAM entry, the new precedence value.

3. The method of claim 1,
    wherein processing the first resultant entry comprising processing the first resultant entry using a hardware device on the computing device.

4. The method of claim 1, further comprising:
    determining a second precedence order that the computing device uses the plurality of TCAM entries, wherein the second precedence order is different from the first precedence order;
    obtaining, from second software precedence data, a plurality of precedence values for the plurality of TCAM entries; and
    updating the second software precedence data to produce the second precedence order for the plurality of precedence values.

5. The method of claim 4, further comprising:
    determining, based on the second precedence order and from a plurality of matched entries, a second resultant entry for the computing device; and
    processing, using the computing device, the second resultant entry.

6. The method of claim 1,
    wherein the plurality of TCAM entries correspond to a plurality of precedence values, and
    wherein the first precedence value corresponds to a numerical value greater than a total number of the plurality of precedence values.

7. The method of claim 1,
    wherein the priority criterion designates a largest absolute value to be the highest priority entry, and
    wherein comparing the first precedence value with the second precedence value comprises determining whether the first precedence value is greater than the second precedence value.

8. A system for processing ternary content-addressable memory (TCAM) data, comprising:
    a TCAM device configured to store a plurality of TCAM entries comprising a TCAM entry;
    a computing device coupled to the TCAM device, wherein the computing device is configured to:
        assign, using a software application and based on a previous precedence value, a first precedence value to a payload in the TCAM entry of the TCAM device, wherein the previous precedence value is extracted and deleted from the payload by the software application;
        transmit a first search query to the TCAM device;

obtain, from the TCAM device and in response to transmitting the first search query, a first matched entry corresponding to the TCAM entry and a second matched entry from the plurality of TCAM entries;

obtain, from first software precedence data stored in payloads from the first matched entry and the second matched entry, the first precedence value for the first matched entry and a second precedence value for the second matched entry;

compare, using a priority criterion, the first precedence value for the first matched entry with the second precedence value for the second matched entry to select a first resultant entry, wherein the priority criterion determines a first precedence order that the computing device uses the plurality of TCAM entries; and process the first resultant entry.

9. The system of claim 8, wherein the computing device is further configured to:

obtain a previous precedence value for a TCAM entry;

determine a new precedence value for the TCAM entry, wherein the new precedence value is different from the previous precedence value; and assign, to the TCAM entry, the new precedence value.

10. The system of claim 8, wherein the computing device is further configured to:

determine a second precedence order that the computing device uses the plurality of TCAM entries, wherein the second precedence order is different from the first precedence order;

obtain, from second software precedence data, a plurality of precedence values for the plurality of TCAM entries; and update the second software precedence data to produce the second precedence order for the plurality of precedence values.

11. The system of claim 10, wherein the computing device is further configured to:

determine, based on the second precedence order and from a plurality of matched entries, a second resultant entry for the computing device; and process the second resultant entry.

12. The system of claim 8, wherein the plurality of TCAM entries correspond to a plurality of precedence values, and wherein the first precedence value corresponds to a numerical value greater than a total number of the plurality of precedence values.

13. The system of claim 8, further comprising:

a hardware device disposed inside the computing device, wherein the first resultant entry is processed using the hardware device.

14. A non-transitory computer readable medium storing instructions for processing ternary content-addressable memory (TCAM) data, the instructions, when executed by a computer processor, comprising functionality for:

assigning, using a first software application and based on a previous precedence value, a first precedence value to a payload in a TCAM entry of a TCAM device, wherein the previous precedence value is extracted and deleted from the payload by the first software application;

transmitting a first search query to the TCAM device, wherein the TCAM device stores a plurality of TCAM entries comprising the TCAM entry;

obtaining, from the TCAM device and in response to transmitting the first search query, a first matched entry corresponding to the TCAM entry and a second matched entry from the plurality of TCAM entries;

obtaining, from first software precedence data stored in payloads from the first matched entry and the second matched entry, the first precedence value for the first matched entry and a second precedence value for the second matched entry;

comparing, using a priority criterion, the first precedence value for the first matched entry with the second precedence value for the second matched entry to select a first resultant entry, wherein the priority criterion determines a first precedence order that a second software application uses the plurality of TCAM entries; and processing, using the second software application, the first resultant entry.

15. The non-transitory computer readable medium of claim 14, wherein the instructions further comprise functionality for:

obtaining a previous precedence value for a TCAM entry;

determining a new precedence value for the TCAM entry, wherein the new precedence value is different from the previous precedence value; and assigning, to the TCAM entry, the new precedence value.

16. The non-transitory computer readable medium of claim 14, wherein the instructions further comprise functionality for:

determining a second precedence order that the first software application uses the plurality of TCAM entries, wherein the second precedence order is different from the first precedence order;

obtaining, from second software precedence data, a plurality of precedence values for the plurality of TCAM entries; and updating the second software precedence data to produce the second precedence order for the plurality of precedence values.

17. The non-transitory computer readable medium of claim 14, wherein the instructions further comprise functionality for:

determining, based on the second precedence order and from a plurality of matched entries, a second resultant entry for the first software application; and processing, using the first software application, the second resultant entry.

18. The non-transitory computer readable medium of claim 14, wherein the priority criterion designates a largest absolute value to be the highest priority entry, and wherein comparing the first precedence value with the second precedence value comprises determining whether the first precedence value is greater than the second precedence value.

19. The non-transitory computer readable medium of claim 14, wherein the plurality of TCAM entries correspond to a plurality of precedence values, and wherein the first precedence value corresponds to a numerical value greater than a total number of the plurality of precedence values.

* * * * *